United States Patent [19]

Sagert

[11] 4,244,595
[45] Jan. 13, 1981

[54] HAND TRUCK FOR BANDED MASONRY PRODUCTS

[76] Inventor: Darrell L. Sagert, 1821 Oakdale Dr., Waukesha, Wis. 53186

[21] Appl. No.: 970,188

[22] Filed: Dec. 18, 1978

[51] Int. Cl.³ ............................ B62B 1/04; B62B 1/26
[52] U.S. Cl. .................................. 280/47.29; 414/490
[58] Field of Search ............... 280/47.24, 47.27, 47.29; 414/490, 667, 671

[56] References Cited

U.S. PATENT DOCUMENTS

| 380,603 | 4/1888 | Steele | 280/47.29 |
|---|---|---|---|
| 795,147 | 7/1905 | Magoffin | 280/47.27 |
| 1,316,239 | 9/1919 | Hogander | 280/47.29 |
| 2,721,086 | 10/1955 | Gorley et al. | 280/47.29 |
| 3,907,138 | 9/1975 | Rhodes | 280/47.29 |

Primary Examiner—John J. Love
Assistant Examiner—Donn McGiehan
Attorney, Agent, or Firm—William A. Denny

[57] ABSTRACT

An improved hand truck is provided for use on construction sites for lifting and transporting banded stacks of masonry products such as bricks and blocks. The hand truck includes a frame supported by a pair of wheels for movement along the ground and tiltable from a vertical position wherein a stack of masonry products can be engaged toward an inclined position wherein the stack can be transported. The frame supports a quickly and conveniently adjustable movable plate for use in supporting the individual units in the stack when the hand truck is in an inclined position and a pair of projecting tongs for insertion into openings in the stacks whereby the stacks can be lifted off the ground when the hand truck is tilted. The position of the tongs can also be quickly and conveniently adjusted both laterally and vertically to permit the tongs to be properly aligned with the openings in the stacks regardless of the relative spacing between the openings in the stacks and regardless of the height of the openings relative to the ground.

1 Claim, 7 Drawing Figures

HAND TRUCK FOR BANDED MASONRY PRODUCTS

BACKGROUND OF THE INVENTION

The invention relates to hand trucks and more particularly to hand trucks for use on a construction site for handling masonry products such as bricks or masonry blocks.

Masonry products are commonly delivered by motor truck to a construction site in units of approximately 400 or more. The units generally consist of approximately four subunits each of which contains approximately 100 bricks or blocks encircled and held together by a strapping tape. These subunits are commonly called a band. The bricks or blocks are arranged in the band to provide openings in the lower portion of the banded subunits to permit tongs of a lift truck to be inserted for lifting the banded subunit for transport to the work area from the point of truck unloading.

One of the problems with the transport of the stacks or bands is that the terrain of construction sites is such that the masonry products, upon unloading from the motor truck, are frequently positioned on unlevel ground. Furthermore, the bricks and other masonry products come in a variety of sizes such that the openings provided in the lower portion of the subunits or bands vary considerably in their positions. This makes it frequently necessary to adjust the vertical and horizontal position of the tongs relative to the ground. Such adjustment is time consuming and labor intensive. Due to the high cost of labor in the construction industry, such adjustment makes transportation of the banded units from the delivery site to the work areas a relatively time consuming and expensive operation. This is especially true when care is being exercised to avoid damage to the masonry products.

SUMMARY OF THE INVENTION

The invention provides an improved hand truck for use on construction sites to convey bricks and other masonry products. The hand truck includes tongs or forks which are readily adjustable and which can be accurately placed in the openings in the stacks or bands of bricks even though the bricks are positioned on uneven ground. Further, it can be readily adapted for use in conveying a variety of different sizes of masonry products.

More specifically, the improved hand truck includes a frame and wheels for supporting the frame for movement over the ground and for tiltable movement between a vertical position and an inclined position. It also includes a supporting plate positioned on the frame for generally longitudinal movement with respect to the frame, the plate having a surface for supporting a stack of masonry products thereon when the hand truck is in the inclined or transporting position.

The hand truck also includes a pair of tongs projecting at right angles to the surface of the plate and adapted to be positioned in the openings in the bands of masonry products for lifting and transport thereof. Means are also provided for supporting the tongs for rapid and convenient adjustment in both the longitudinal and in the lateral directions to accommodate variation in the angular position of the banded units and in the height of the openings in the units. The means for supporting the tongs includes a means for moving the tongs and the supporting plate longitudinally with respect to the frame and means for supporting the tongs for slidable lateral movement with respect to the frame and with respect to each other.

Various features and advantages of the invention are set forth in the following description, in the claims and in the drawings.

Before explaining the preferred embodiment of the invention in detail, it is to be understood that the phraseology and terminology employed herein, are for the purpose of description and should not be regarded as limiting.

DESCRIPTION OF THE PREFERRED EMBODIMENT

Figure 1:
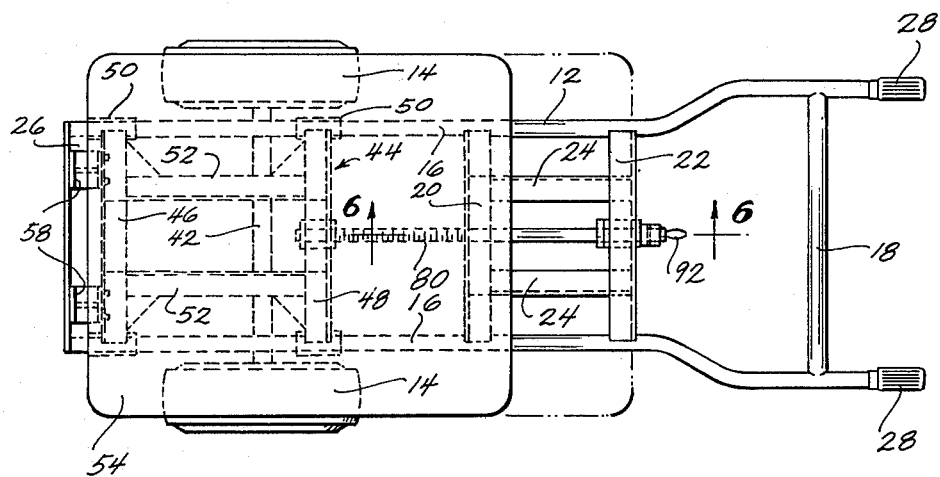
FIG. 1 is a plan view of a hand truck embodying the present invention.
Figure 2:
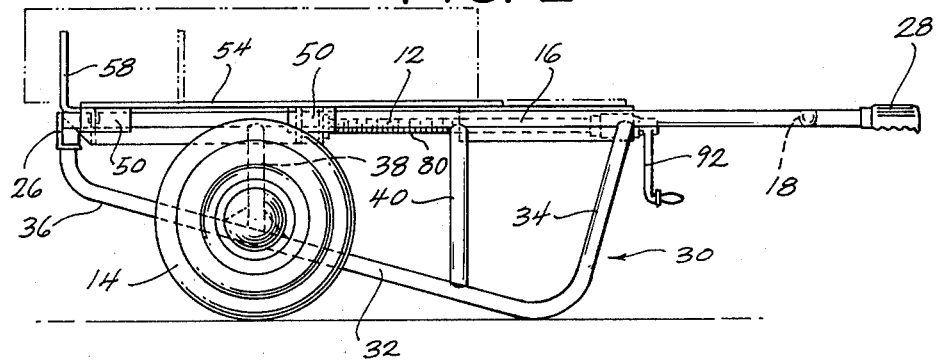
FIG. 2 is a side elevation view of the hand truck shown in FIG. 1.
Figure 3:
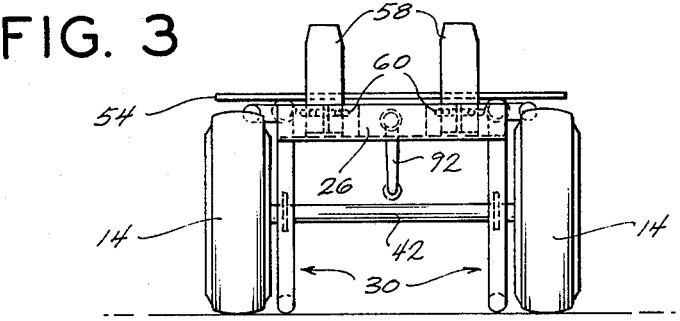
FIG. 3 is an end elevation view of the hand truck shown in FIG. 1.

Illustrated in FIGS. 1 through 3 is a hand truck particularly adapted for use on construction sites for lifting and transporting banded stacks of masonry products from the motor truck delivery site to the locations where they are to be used. The hand truck generally includes a frame 12 supported for movement along the ground by a pair of wheels 14 and for tiltable movement from a vertical position to the horizontal position shown in FIG. 2. The frame 12 is comprised of a pair of generally parallel longitudinally extending side frame bars 16 rigidly joined together by a tubular cross bar 18 and a pair of tie bars 20 and 22. The tie bars 20 and 22 are in turn joined together and thereby reinforced by a pair of spaced parallel longitudinally extending support bars 24, each secured at its opposite ends to the tie bars 20 and 22, respectively. The frame side bars 16 each include a rearward end as viewed in FIGS. 1 and 2 terminating in handles 28. The opposite or forward ends of the frame side bars 16 are joined by a transverse support member 26 secured at its opposite ends to the frame side bars 16.

The frame side bars 16 are each supported by a generally triangular vertically extending frame 30, the frames 30 each being comprised of an elongated continuous tubular member 32 bent at a right angle and secured at its opposite ends to one of the frame side bars 16. One of the end portions 34 of the tubular member 32 is secured to the frame side bar 16 generally adjacent the handle 28 and extends downwardly and forwardly. As also shown therein, the tubular member 32 also includes an integral portion 36 extending forwardly from the lower end of the portion 34 and secured at its forward end to the forward end of the frame side bar 16. As shown in FIG.

2, the angular portion of the tubular member 32 joining the portions 34 and 36 provides a ground engaging support for the hand truck when the hand truck is in the inclined position. The frames 30 also each include a pair of spaced parallel tubular frame members 38 and 40 each secured at one end to the frame side bar 16 and at the other end to the portion 36 of the tubular member 32.

The hand truck also includes an axle 42 welded or otherwise rigidly connected at its opposite ends to the respective frames 30 adjacent the lower ends of the frame members 38. The axle 42 supports the wheels 14 at its opposite ends. In the illustrated construction, the wheels 14 are comprised of low pressure inflatable tires to thereby provide good ground flotation and a relatively smooth ride for bricks or other masonry products being carried by the hand truck.

The hand truck further includes a slide assembly 44 supported for slidable movement along the frame side bars 16. The slide assembly 44 includes a pair of parallel spaced laterally extending bars 46 and 48 each having sleeves 50 welded to their opposite ends. The sleeves 50 are slidably supported on the frame side bars 16 for longitudinal movement thereon. The laterally extending bars 46 and 48 of the slide assembly 44 are rigidly joined together by a pair of spaced support bars 52 extending there between and each welded at their opposite ends to the laterally extending bars 46 and 48.

The hand truck also includes a supporting plate 54 supported by the slide assembly 44 for longitudinal movement with respect to the frame side bars 16. The upper surface of the supporting plate 54 as seen in FIGS. 2 and 3, is intended to provide support for the individual bricks or blocks in the banded units. The plate 54 itself is rigidly secured to the support bars 46 and 48 of the slide assembly 44. The hand truck also includes a pair of projecting lift tongs 58 which project perpendicularly with respect to the upper surface of the plate 54 and are particularly adapted for insertion into openings provided in the banded stacks of bricks or blocks.

When the hand truck is to be used, it is positioned substantially vertically and is manipulated such that the tongs 58 can extend into the openings provided in the banded stack and such that the plate 54 is positioned against or closely adjacent a face of the banded stack. With the tongs 58 positioned in the openings, the hand truck and the banded stacks are tilted rearwardly such that the stack is then lifted by the tongs and rests against the upper surface of the plate 54. As so picked up and supported by the hand truck, the stack of masonry blocks can be conveniently transported as a unit to the work location.

As will be readily appreciated by one skilled in the art, the banded stacks of masonry products, when delivered to the construction site, are commonly positioned on rough or uneven terrain. Accordingly, the stacks are usually not supported in a completely horizontal position and the height of the stacks may require adjustment of the position of the lift tongs 58 of the hand truck to facilitate positioning of the tongs 58 into openings provided in the banded stacks. Additionally, the horizontal spacing of the openings in the banded stacks may be varied depending on the type of bricks or blocks which are contained in the stacks. One of the principal advantages of the invention is that the tongs 58 are supported in such a manner that they can be readily adjusted to be aligned with the openings in the stacks regardless of their position due to uneven or rough terrain.

Figure 4:
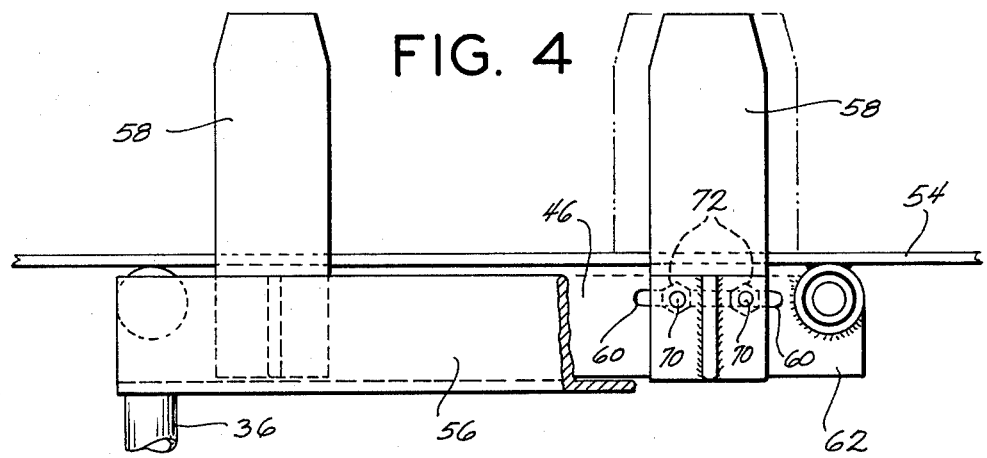
FIG. 4 is an enlarged partial view of the hand truck lift tong assembly as shown in FIG. 3 with portions thereof broken away.
Figure 5:
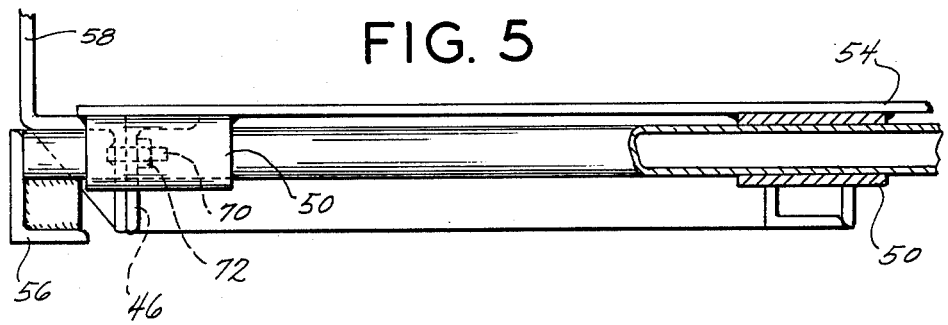
FIG. 5 is an enlarged partial view of the hand truck supporting plate and tongs shown in FIG. 2, with portions broken away.

Additionally, the lift tongs 58 are also supported for relative lateral slidable movement such that the spacing between them can be easily and quickly adjusted to permit alignment with the openings in the bands or stacks. As best seen in FIGS. 4 and 5 of the drawings, the means for providing such slidable movement of the tongs 58 includes a pair of elongated laterally extending slots 60 cut in a face portion 62 of the bar 46. The portion 62 of the bar 46 defines a plane generally parallel to that of the lift tongs 58 and perpendicular to the plate 56. The slots 60 are generally parallel to the plane defined by the surface 56 of the plate 54 and provide for lateral slidable movement of the tongs 58. The tongs 58 include a planar portion positioned against the planar portion 62 of the bar 46 for slidable movement therealong. The tongs 58 are restrained against the planar portion 62 of the bar 46 for horizontal slidable movement by a pair of bolts 70. Nuts 72 are threadably received on the ends of the bolts 70 such that the tongs 58 can be selectively clamped against the planar portion 62 of the bar 46 or permitted freely slidable movement.

Figure 6:
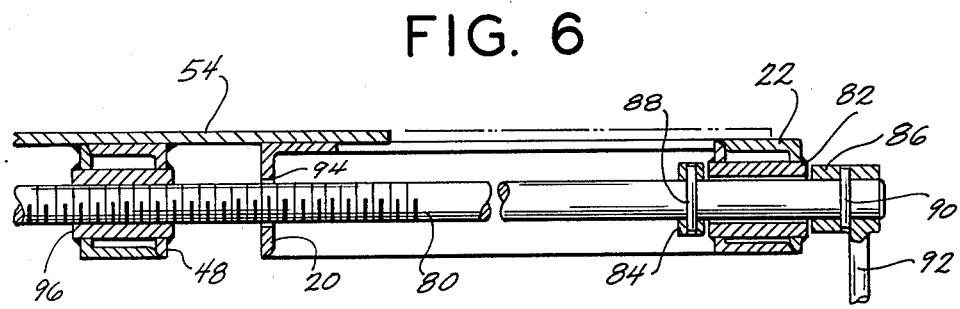
FIG. 6 is an enlarged cross section view taken generally along lines 6—6 in FIG. 1 and illustrating details of the adjusting mechanism for the support plate.
Figure 7:
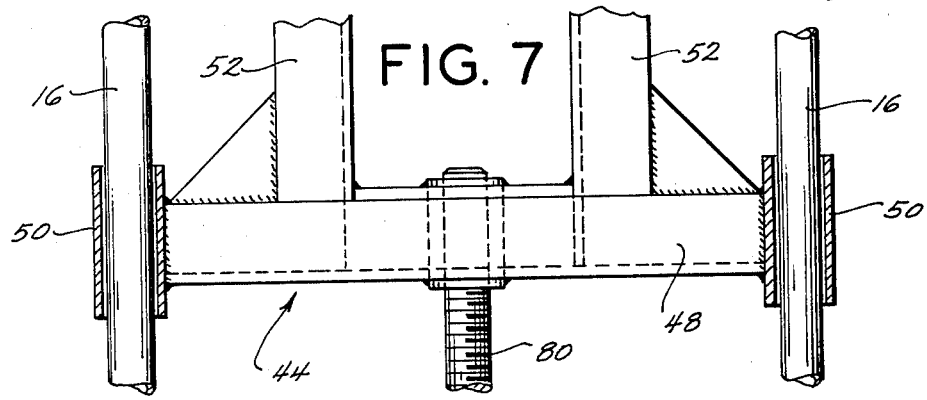
FIG. 7 is an enlarged partial view of the hand truck slide assembly shown in FIG. 1, with portions broken away.

Means are also provided for quickly and conveniently effecting vertical adjustment of the tongs and supporting plate when the hand truck is positioned to pick up another band or stack of masonry products. The means includes an elongated longitudinally extending screw 80 supported intermediate and parallel to the frame side bar 16 and having one end connected to the slide assembly 44. The screw 80 is best shown in FIG. 6 as including an end rotatably supported in a bushing 82 in turn supported by the tie bar 22. The screw 80 is restrained against longitudinal movement by a pair of collars 84 and 86 positioned on opposite sides of the bushing 82 and fixedly joined to the screw 80 by pins 88 and 90, respectively. To provide for rotation of the screw 80, a crank 92 is secured to it. The opposite end of the screw 80 extends through a bore 94 in the tie bar 20 and into a threaded sleeve 96 welded or otherwise rigidly joined to the transverse bar 48 of the slide assembly 44. Rotation of the screw 80 by operation of the crank will thus cause longitudinal movement of the sleeve 96 and the slide assembly 44 with respect to the screw 80 and with respect to the frame 12.

In operation, when it is desired to transport a banded unit of bricks or other masonry products to a work location, the hand truck is positioned adjacent a face of a banded stack and the crank rotated to effect movement of the slide assembly 44 such that the plate 54 and the lift tongs 58 are properly positioned with respect to the openings provided in the stack. The lift tongs 58 can then be manually moved laterally to properly aline them with the openings. As will be recognized by one skilled in the art, the lift tongs and the plate 54 can thus be quickly and conveniently adjusted to permit engagement of the tongs with the openings in the stack of bricks and to thereby facilitate lifting of the stack of bricks onto the hand truck for transport to the job location.

Although the illustrative embodiment of the invention has been described in considerable detail for the purpose of disclosing a practical operative arrangement by means of which the invention may be practiced advantageously, it is to be understood that the particular hand truck illustrated and described is intended to be illustrative only and that the various novel characteristics of the invention may be incorporated in other structural forms without departing from the spirit and scope of the invention as defined in the claims which follow.

The principles of this invention having now been fully explained in connection with the foregoing description, I hereby claim as my invention:

1. A hand truck for use on construction sites for lifting and transporting a banded stack of masonry products, said stack including at least one opening therein, the hand truck including a frame, wheels for supporting the frame for movement over the ground and for supporting the frame for tiltable movement between a vertical position and an inclined position, a plate supported by the frame for generally longitudinal movement with respect to the frame, said plate having a surface for supporting the individual units in the stack of masonry products, a pair of tongs mounted on said plate to project therefrom so that they can be positioned in the opening in said stack for lifting support of said stack, an elongated screw journalled in said frame for rotary movement but fixed against axial movement, a nut fixed to said plate used in threaded engagement with said screw so that rotation of said screw will produce movement of said plate and its associated tongs longitudinally of said frame for positioning said tongs in accordance with the location of the opening in the stack, means for rotating said screw, and means for adjusting said tongs laterally of said frame to adjust their spacing on said plate.

* * * * *